Figure 1:
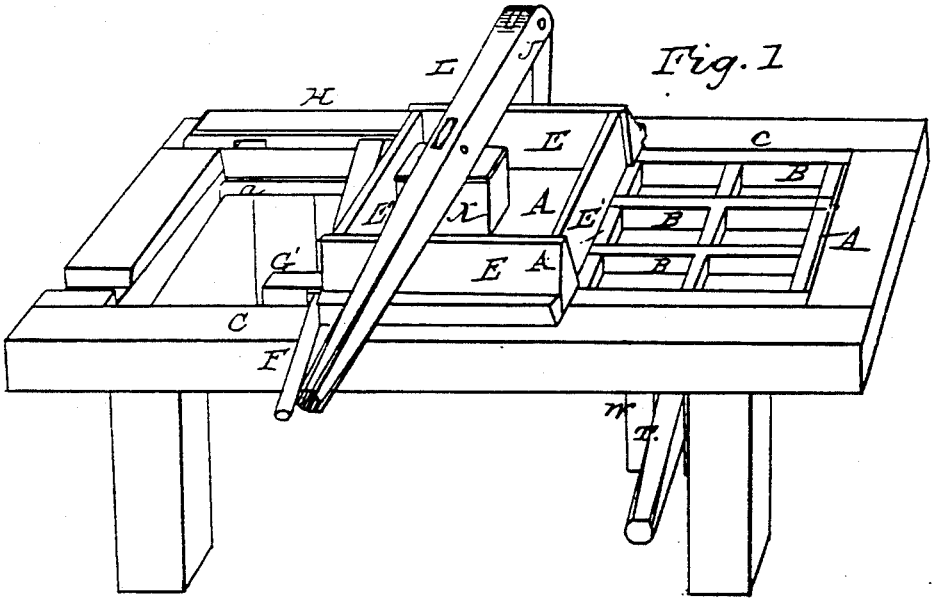
Figure 2:
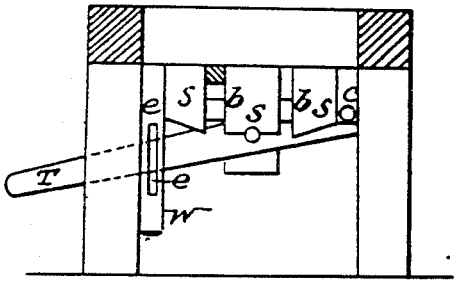

T. D. GAIL.

Butter Worker.

BEST AVAILABLE COPY

No. 47.

A. I. Patented July 20, 1841.